May 1, 1951  A. R. REHRIG ET AL  2,551,160
INTERNAL INSULATION OF VESSELS
Filed Feb. 5, 1945
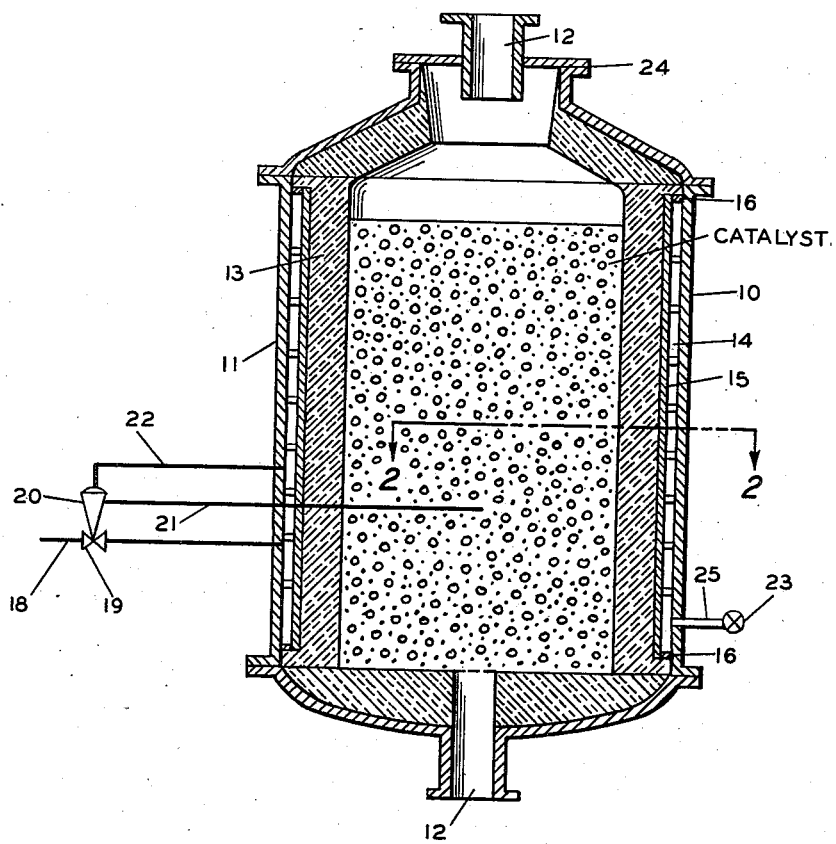
FIG.-1
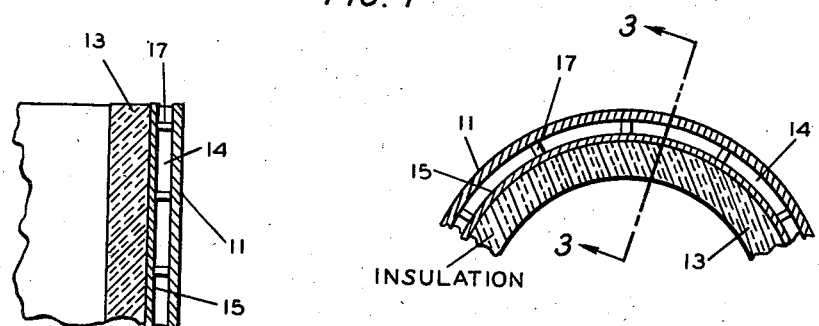
FIG.-3
FIG.-2
INVENTORS
A. R. REHRIG
E. STRUNK
BY Hudson 2nd Young
ATTORNEYS Patented May 1, 1951

2,551,160

UNITED STATES PATENT OFFICE 2,551,160

INTERNAL INSULATION OF VESSELS

Alexander R. Rehrig and Edward Strunk, Phillips, Tex., assignors to Phillips Petroleum Company, a corporation of Delaware Application February 5, 1945, Serial No. 576,323

6 Claims. (Cl. 23—288)

This invention relates to the thermal insulation of vessels and to improvements in the insulation of vessels in which the insulation is subject to cracking during operation. In particular it relates to a means of strengthening and supporting the insulation which is applied within thermally insulated vessels.

In a copending application, Serial Number 548,296, filed August 5, 1944, now Patent No. 2,545,384, of which one of us is the inventor, a novel manner of insulating a catalyst chamber has been described. According to that invention, the insulation is installed with a space between the insulation and shell wall, this space being supplied with a vapor at a pressure slightly above that within the chamber to prevent any vapor or fluid escaping from the interior of the chamber through cracks in the insulation and thus by-passing the catalyst.

Such insulation is frequently used for the double purpose of minimizing heat losses and protecting the chamber walls of vessels employed in thermal conversion processes. In catalytic hydrocarbon conversions, for example, the catalyst becomes deactivated by a deposit of carbon and temperatures in the range of 1,000° F. to 1,500° F. are required to burn off the carbon and regenerate the catalyst. At such temperatures the chamber walls of the vessel deteriorate rapidly and consequently require the protection of heat-resisting insulation to prevent the walls from being subjected to temperatures approaching those employed in the catalyst regenerations. Also, in those conversion processes which involve endothermic reactions, the use of insulation to prevent heat losses is desirable in order to maintain an efficient rate of conversion. Thus it has become desirable and convenient to insulate the interior of the usual metal chamber with an insulating material, preferably of the refractory type. With such material it has become possible to use chambers of relatively inexpensive materials, such as carbon steel, instead of more expensive special metal alloys and still avoid the detrimental effects of high temperature. Furthermore, the insulation retards heat losses during conversion.

A common source of trouble, however, in the use of internally insulated chambers is the cracking of the insulation and channeling of fluids therethrough. This undesirable cracking may be caused by unequal heating and/or cooling during operation and is particularly likely to occur in regions around points of attachment of various pieces of structure, such as at connections fastening supports for screens in the case of catalyst beds or in other areas where a continuous solid surface of insulation is interrupted or disturbed. Then tendency to crack and channel is especially prevalent in insulated catalyst chambers containing a bed or beds of catalyst since the catalyst presents a hindrance to the flow of fluid which may seek a path of less resistance through cracks which by-pass the catalyst bed. Such an eventuality results in unsatisfactory operation, heat losses through the chamber, and incomplete conversion of the process material. The development of these cracks in a chamber liner may permit "hot spots" to form on the chamber shell, especially during regeneration, with the consequent deterioration of the shell. Where a crack is formed it may be widened and lengthened and the insulation loosened from the walls of the chamber by fluids passing through the cracks and between the chamber wall and the insulation or by the contraction and expansion incident to heating and cooling of the chamber, such as may occur between regeneration and conversion steps in catalytic hydrocarbon conversion processes or between reaction and shutdown periods for the chamber. Due to the usual difference in coefficients of expansion between the metallic shell of the vessel and the insulating liner, the tendency of the insulation to become loosened from the chamber wall is increased, even though the shell may not become as hot as the insulation. The formation of fluid-tight insulation liners is further complicated by the tendency of the insulating materials, such as refractory cements, to shrink on setting after being cast in the form of a plastic mass. With preformed refractory blocks or sections cemented at the joints, crumbling of the refractory cement used, and rupture of the joint seal frequently occurs due to the strain caused by unequal heating and cooling and the difference in coefficients of expansion between the sealing cement and the block of refractory section and further due to the above-mentioned tendency of refractory cements to shrink. Experience has shown that with present-day methods of insulation and insulating materials the insulation tends to crack and permit undesirable escape of fluids from the conversion zone. In particular, when conducting reactions utilizing solid catalytic material disposed in the catalyst chamber in the form of beds or otherwise, a substantial pressure drop exists between fluid inlet and outlet, and flow through cracks in the insulating liner, and then between the liner and the shell, may occur since this would represent a path of least resistance. Even where there is no substantial resistance to flow in the chamber, after long periods of operation and the successive fluctuations in temperature which occur in reaction and regeneration cycles etc., formation of cracks and separation of lining from the shell, may cause by-passing of portions of the catalyst mass by portions of the material being reacted. The present invention is, therefore, particularly applicable to the catalytic cracking of hydrocarbons, as for example, cracking of gas oils or naphthas at temperatures of 850–1150° F. over catalysts such as bauxite, silica-alumina, or acid-treated clay catalysts.

An object of this invention is to describe a novel manner of insulating thermal vessels.

Another object is to describe a method of insulating thermal vessels to insure a vapor space between the vessel wall and a lining of insulation.

A further object is to provide a foraminous support for the internal insulation of thermal vessels.

A still further object is to provide a foraminous member for the support of the internal insulation of thermal vessels and lugs attached thereto to further support and space said member from the vessel wall.

Another object is to describe a thermally insulated vessel provided with a foraminous member to support the insulation and attached lugs to hold said member apart from the vessel wall and form a closed space to confine a gas under pressure differentially controlled to exceed that within the vessel.

Other objects will be apparent after a study of the disclosure which follows and the accompanying drawings in which:

Figure 1 is an elevational view in cross section of a catalyst chamber embodying the improvements of this invention;

Figure 2 is a cross sectional view taken on lines 2—2 of Figure 1; and

Figure 3 is a sectional elevational view taken on lines 3—3 of Figure 2.

According to the present invention, insulation is installed in a catalyst chamber with a space arranged between the chamber wall and the insulation by means of a metal grating whose openings may initially be filled with low-melting sealing wax and which may furnish support for the insulation. Preferably the grating and insulation are additionally supported by some means, such as lugs welded to the grating at spaced regular intervals and resting against the chamber wall, to strengthen the grating. The lugs will be sufficiently long to insure that a space of the desired width is formed.

A suitable type of metal grating may be the well-known expanded metal grating. However, other types of screen or perforated plates may be used. The best type of grating is one which furnishes a considerable proportion of open area in order that the vapor in the space may effectively act against the body of the insulation. It may be desirable in using plastic insulating materials, to fill the openings initially with some low-melting substance, such as paraffin wax, which will allow the insulation to be applied to the grating without extrusion of the pliable insulation through the open spaces of the grating with consequent clogging or sealing of the vapor space behind the insulation. After the insulation has set the sealing substance may be melted and withdrawn as a liquid, thus reopening the perforations.

Referring to the drawings, the numeral 10 represents a catalyst chamber having a cover 24, a shell wall 11, inlet and outlet openings 12, and an internal insulation lining 13 which defines a vapor space 14 with the shell wall. The insulation is supported by an expanded metal grating 15 which may be fastened to suitable supports 16. Attached to the grating at regular intervals are lugs 17 which separate the grating from the shell and at the same time furnish additional support to the suspended grating. Vapor is supplied to the vapor space through line 18 and valve 19. The valve 19 which governs the amount of vapor entering the vapor space is controlled by differential pressure regulator 20 which is actuated by a variation in pressure between the catalyst bed and the vapor space as communicated to the regulator through terminals 21 and 22, respectively. The regulator is adjusted to establish and maintain a pressure within the vapor space at least as high or slightly higher than that within the catalyst chamber. Melted material used as an initial seal of the openings in the grating or any liquid collecting in the vapor space may be withdrawn by line 25 and valve 23.

If it is desirable to divide the vapor spaces into sections by annular bulkheads extending into the body of the insulation as described in above-mentioned earlier application, the supporting means, such as expanded metal grating, may likewise be divided into sections of width equal to the distance between consecutive bulkheads. In this case, the bulkheads may serve as supports to which the grating may be attached. With the vapor spaces divided into sections, it is increasingly important that the individual spaces be free of constricting extrusions of insulation. Likewise, since the bulkheads serve as supporting members and are inserted more frequently than at the opposite extremes of the vapor space, the number and density of supporting lugs may be reduced. By the same analogy, fewer or no bulkheads for subdividing the vapor space may be required since the lining of insulation and grating with the supporting lugs is appreciably stronger than a lining of insulation without the grating or lugs and will withstand a larger pressure differential between the vapor space and catalyst chamber without bursting out or caving in the lining.

If the insulation is applied in plastic form, use of a grating as a support for the insulating material is further advantageous in solving a serious problem in the securing and handling of practical forms for molding the insulation while in its plastic state. The construction of a monolithic wall of insulation in a vessel in a manner to form a space between the shell wall and the insulation requires a form having two sides between which the plastic insulation may be poured and allowed to set. Using a supported grating as a base to which the insulation is applied, the grating may serve as one side of the forms which are required. This is additionally desirable as the side of the form nearest the chamber wall usually presents a difficult problem of loosening and removal after the plastic insulation has set and become hardened.

With the insulation applied to a perforate support, such as an expanded metal grating, the danger of failure of the insulation wall is lessened by relieving the strain on the section of insulation that is applied directly to the chamber wall as well as relieving strain throughout the portion of insulation surrounding the vapor space. The application of the insulation to a support, such as expanded metal grating, having openings into which the insulation may penetrate for a short distance forms a sturdier structure than is formed when the insulation is applied to a plain, relatively smooth surface such as the chamber wall. Breaking away of the insulation from the supporting member is likewise less with a grating type of support than with a smooth solid surface and shrinkage of the insulation on setting or differences in coefficients of expansion between the insulation and the metallic supporting member are of less concern. The installation of the insulation itself has not been described in detail since, after the installation of the supporting foraminous member with or without the appended lugs, the insulating may be completed in any well-known manner. Although fire bricks, concrete blocks, or other preformed insulating blocks may be used it is preferred in the practice of this invention to use plastic, hard-setting materials, such as magnesite, concrete, mixtures of metallic oxides and concrete, mixtures of diatomaceous earths and cement, or other refractory clays and cellular mixtures such as fire clay, Firecrete, Insulag, Insulcrete, or sillimanite. Slurries of finely divided particles of these materials in water are usually prepared and applied by pressure spray guns or troweled into place by hand. Following this the material is allowed to dry slowly in situ.

While the description of the invention has been made of a catalyst chamber employing the principles of the invention, it is not intended that the application of the invention be limited by such discussion. The invention applies equally as well to any thermally insulated vessel in which it may be desirable to support the insulation on a suspended member within the vessel. Furthermore, the lugs may be omitted and the grating suspended adjacent the shell wall, thus eliminating the vapor space, and the pressure regulator omitted, if desired. Likewise, the vessel may be vertically disposed as shown, or it may be horizontal or in other desired positions.

Since these and other changes and modifications may be made without departing from the spirit of the invention, it is intended that all matter contained herein shall be interpreted as illustrative and explanatory only, and not in a limiting sense.

We claim:

1. In the manufacture of vessels having refractory heat insulating linings wherein said linings are spaced from the wall of said vessels, the process of installing said linings which comprises positioning within said vessel a metallic foraminous member conforming in shape to the desired lining, filling the openings in said foraminous member with a solid material fluid at more elevated temperatures, applying said insulation to said foraminous member in plastic form and allowing said plastic insulation to harden, and then removing the material filling said openings in said foraminous member by the application of sufficient heat to melt said material.

2. A process according to claim 1 in which the foraminous member includes a plurality of spacing lugs defining a space between said liner and the wall of said vessel.

3. In the manufacture of internally heat insulated vessels having interiorly positioned heat insulating linings spaced from the outer wall, the process of installing said linings which comprises introducing into a metallic shell a metal foraminous member coextensive therewith, having spacing lugs attached thereto at a plurality of points, said spacing lugs being in contact with the interior of said shell and the openings in said foraminous member being filled with a solid material fluid under the influence of heat, applying to the interior of said foraminous member a refractory cement in a plastic state, and allowing said cement to harden, and melting the solid material filling the openings in the foraminous member and removing said material from the space between the liner and the shell.

4. In the manufacture of an internally heat-insulated vessel having an interiorly positioned heat-insulating lining spaced from the outer wall, the process of installing said lining which comprises introducing into a metallic shell of said vessel a continuous metal foraminous member coextensive therewith, having spacing lugs attached thereto at a plurality of points, said spacing lugs being in contact with the interior of said shell, partially filling openings in said foraminous member with a solid material fluid under the influence of heat in such a manner that the interior surface of the foraminous member is exposed, applying to the interior side of said foraminous member a refractory cement in a plastic state, allowing said cement to harden, melting the solid liquefiable material substantially filling the openings of the foraminous member and removing said material from the space between the liner and shell.

5. A thermally lined vessel which comprises, in combination, a metallic shell, a continuous metallic foraminous supporting member coextensive with the interior of said shell and spaced therefrom, a heat insulating lining disposed in said shell contiguous to said foraminous member and on an opposite side thereof from said shell, said heat insulating lining being bonded to said foraminous member by extending partially into the openings in said foraminous member to thereby partially embed said foraminous member in said insulating lining.

6. A thermally lined vessel which comprises, in combination, a metallic shell, a continuous metallic foraminous supporting member coextensive with the interior of said shell and spaced therefrom, spacing lugs attached to said shell and to said foraminous member whereby said foraminous member is supported by said shell in a position spaced apart therefrom, a heat insulating lining disposed in said shell contiguous to said foraminous member and on an opposite side thereof from said shell, said heat insulating lining being bonded to said foraminous member by extending partially into the openings in said foraminous member to thereby partially embed said foraminous member in the said insulating lining.

ALEXANDER R. REHRIG.
EDWARD STRUNK.

REFERENCES CITED

The following references are of record in the file of this patent:

UNITED STATES PATENTS

| Number | Name | Date |
| --- | --- | --- |
| 1,090,874 | Pier | Mar. 24, 1914 |
| 1,286,135 | Somermier | Nov. 26, 1918 |
| 1,670,557 | Wettstein | May 22, 1928 |
| 2,124,573 | Hayes | July 26, 1938 |
| 2,212,835 | Keane et al. | Aug. 27, 1940 |
| 2,398,546 | Messmore | Apr. 6, 1946 |
| 2,430,652 | Smith | Nov. 11, 1947 |